United States Patent [19]

Witherspoon

[11] 4,309,234
[45] Jan. 5, 1982

[54] TIRE RETREADING ENVELOPE SEAL

[75] Inventor: Phillip L. Witherspoon, Summerfield, N.C.

[73] Assignee: Long Mile Rubber Company, Dallas, Tex.

[21] Appl. No.: 162,156

[22] Filed: Jun. 23, 1980

[51] Int. Cl.³ .................. B29H 5/16; B29H 17/36
[52] U.S. Cl. .................. 156/96; 150/54 B; 156/394 FM; 206/398
[58] Field of Search .......... 156/96, 126–129, 156/394; 206/389, 397, 398, 404, 414, 1.5; 150/54 R, 54 B

[56] References Cited

U.S. PATENT DOCUMENTS

| | | | |
|---|---|---|---|
| 2,468,121 | 4/1949 | Shell | 425/17 |
| 2,966,936 | 1/1961 | Schelkmann | 156/96 X |
| 2,976,910 | 3/1961 | Nowak | 156/96 X |
| 3,207,647 | 9/1965 | Schelkmann | 156/394 |
| 3,236,709 | 2/1966 | Carver | 156/96 |
| 3,325,326 | 6/1967 | Schelkmann | 156/96 |
| 3,689,337 | 9/1972 | Schelkmann | 156/95 |
| 3,698,916 | 10/1976 | Marangoni | 156/394 |
| 3,743,564 | 7/1973 | Gross | 156/394 |
| 3,779,831 | 12/1973 | Reppel | 156/394 |
| 3,802,978 | 4/1974 | Barnett | 156/96 |
| 3,846,201 | 11/1974 | Huskins | 156/96 |
| 3,886,028 | 5/1975 | Hindin et al. | 156/394 |
| 3,895,985 | 7/1975 | Schelkmann | 156/96 |
| 3,933,551 | 1/1976 | Brodie et al. | 156/96 |
| 3,935,045 | 1/1976 | Wolfe | 156/96 |
| 3,951,720 | 4/1976 | Brodie | 156/96 |
| 4,013,499 | 3/1977 | Benigni | 156/394 |
| 4,036,271 | 7/1977 | Presti | 150/54 B |
| 4,075,047 | 2/1978 | Brodie et al. | 156/96 |
| 4,098,936 | 7/1978 | Rawls | 428/40 |
| 4,115,171 | 9/1978 | Dundon | 156/96 |

FOREIGN PATENT DOCUMENTS 746375 3/1956 United Kingdom .................. 156/96

*Primary Examiner*—John E. Kittle
*Attorney, Agent, or Firm*—Richards, Harris & Medlock

[57] ABSTRACT

An improved envelope seal for a tire assembly (10) is provided to protect the bonding surfaces of a tire casing (12) and tread material (14) from exposure to steam and other elements within a pressure chamber (126) during curing. A two piece road curing rim (26) is provided with rim members (36, 38) which extend adjacent the sidewalls (56) of the tire (16). Annular seals (37, 39) are secured about the peripheral edges of the rim members (36, 38) and define first annular sealing faces (86, 88) and second annular sealing faces (90, 92). A flexible envelope (18) covers the bonding surfaces of the tire and extends radially inward adjacent the sidewalls of the tire. The envelope has lips (68, 70) extending laterally outward from the outer surface thereof and having annular sealing faces (94, 96) defined thereon. The envelope (18) is inflated to align the first annular sealing faces (86, 88) and annular sealing faces of the envelope lips (94, 96). The inflation of the tire (16) urges the sidewalls laterally outward and radially outward to form an envelope seal between the first annular sealing faces and envelope annular sealing faces, the second annular sealing faces and the outer surface of the envelope, and the inner surface of the envelope and sidewalls.

8 Claims, 9 Drawing Figures

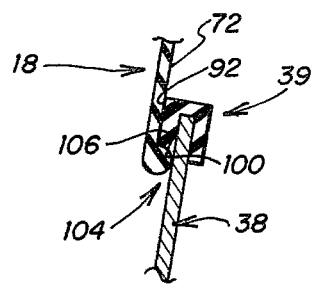
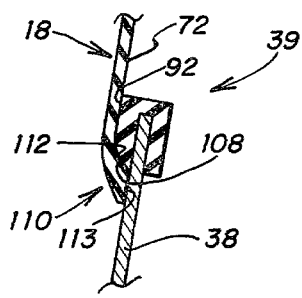
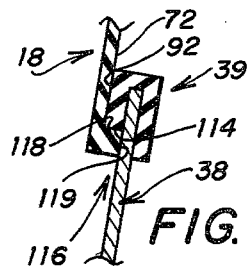
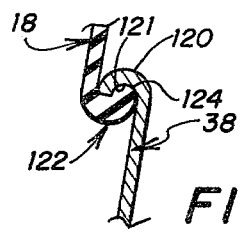
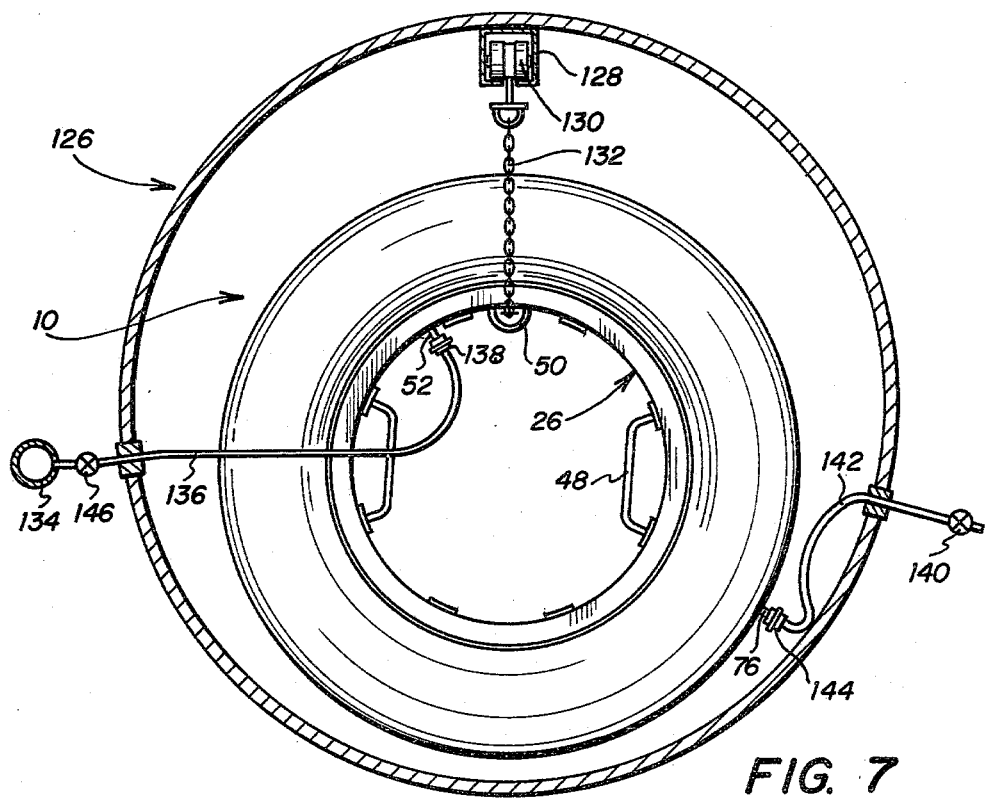

TIRE RETREADING ENVELOPE SEAL

TECHNICAL FIELD

This invention relates to retreading of tires, and more particularly to an envelope seal for use in the retreading process.

BACKGROUND ART

The recapping or retreading of both automobile and truck tires is a large industry. The process includes the application of a precured tread material to a tire casing that has been inspected and buffed to receive the tread. The tread is cemented to the tire casing and the casing is mounted on a curing rim. The cement is then cured under high temperature and pressure in a pressure chamber, typically by steam and compressed air. However, to achieve proper curing the bonding surfaces between the tire casing and tread must not be exposed to the steam. Typically, a flexible envelope is provided which covers the bonding surfaces and is sealed to either the tire casing or curing rim to isolate the bonding surfaces from the steam in the chamber.

One method for enclosing a tire casing and tread material by an airtight flexible cover is disclosed and claimed in U.S. Pat. No. 3,236,709 issued Feb. 22, 1966 to Carver. In the method of this patent, the flexible cover includes a pair of flexible sidewall members which extend over the tire beads so as to engage the same, covering the sidewalls of the tire. A rim is provided which has peripheral flanges. The cover walls extend intermediate the beads and the rim flanges to be in sealing engagement therebetween.

DISCLOSURE OF THE INVENTION

In accordance with the present invention, an apparatus for sealing a flexible envelope used in retreading a tire is provided.

In accordance with the present invention, an apparatus for sealing a flexible envelope for covering the bonding surfaces of a tire having sidewalls to be cured in a pressure chamber is provided. The apparatus includes means for mounting the tire thereon having rim members extending generally radially adjacent the sidewalls of the tire and seals secured about each of the rim members defining first seal surfaces thereon such that when the tire is inflated said first seal faces are engaged with the envelope to seal the envelope.

In accordance with another aspect of the present invention, a flexible envelope for use in curing a tire mounted on a rim in a pressure chamber is provided. The envelope comprises an inner surface surrounding the bonding surfaces of the tire and extending adjacent the sidewalls of the tire when the envelope is positioned on the tire and an outer surface extending adjacent the rim when the tire is mounted on the rim. The envelope further comprises lips extending from the outer surface adjacent the rim when the tire is mounted on the rim and defining first seal faces thereon such that when the tire is inflated, the first seal faces are aligned and engaged with the rim to seal the envelope.

In accordance with yet another aspect of the present invention, an improved method for sealing a flexible envelope covering the bonding surfaces of a tire for retreading in a pressure chamber is provided, the tire having sidewalls being mounted on a rim having rim members extending radially adjacent the sidewalls of the tire and the envelope extending radially inward adjacent the sidewalls of the tire to radially inner edges. The improved method includes the steps of securing a seal about each of the rim members defining annular first seal faces thereon and forming a lip on the outer surface of the envelope adjacent the radially inner edges defining annular second seal faces thereon such that when the tire is inflated, the seal faces are aligned and engaged to seal the envelope.

BRIEF DESCRIPTION OF DRAWINGS

A more complete understanding of the invention and its advantages will be apparent from the following Detailed Description taken in conjunction with the accompanying Drawings in which:

FIG. 3 illustrates the second embodiment of the envelope seal of the present invention;

FIG. 4 illustrates a third embodiment of the envelope seal of the present invention;

FIG. 5 illustrates a fourth embodiment of the envelope seal of the present invention;

FIG. 6 illustrates a fifth embodiment of the envelope seal of the present invention;

FIG. 7 illustrates a vertical cross sectional view of the tire assembly mounted in a pressure chamber.

DETAILED DESCRIPTION

Figure 1:
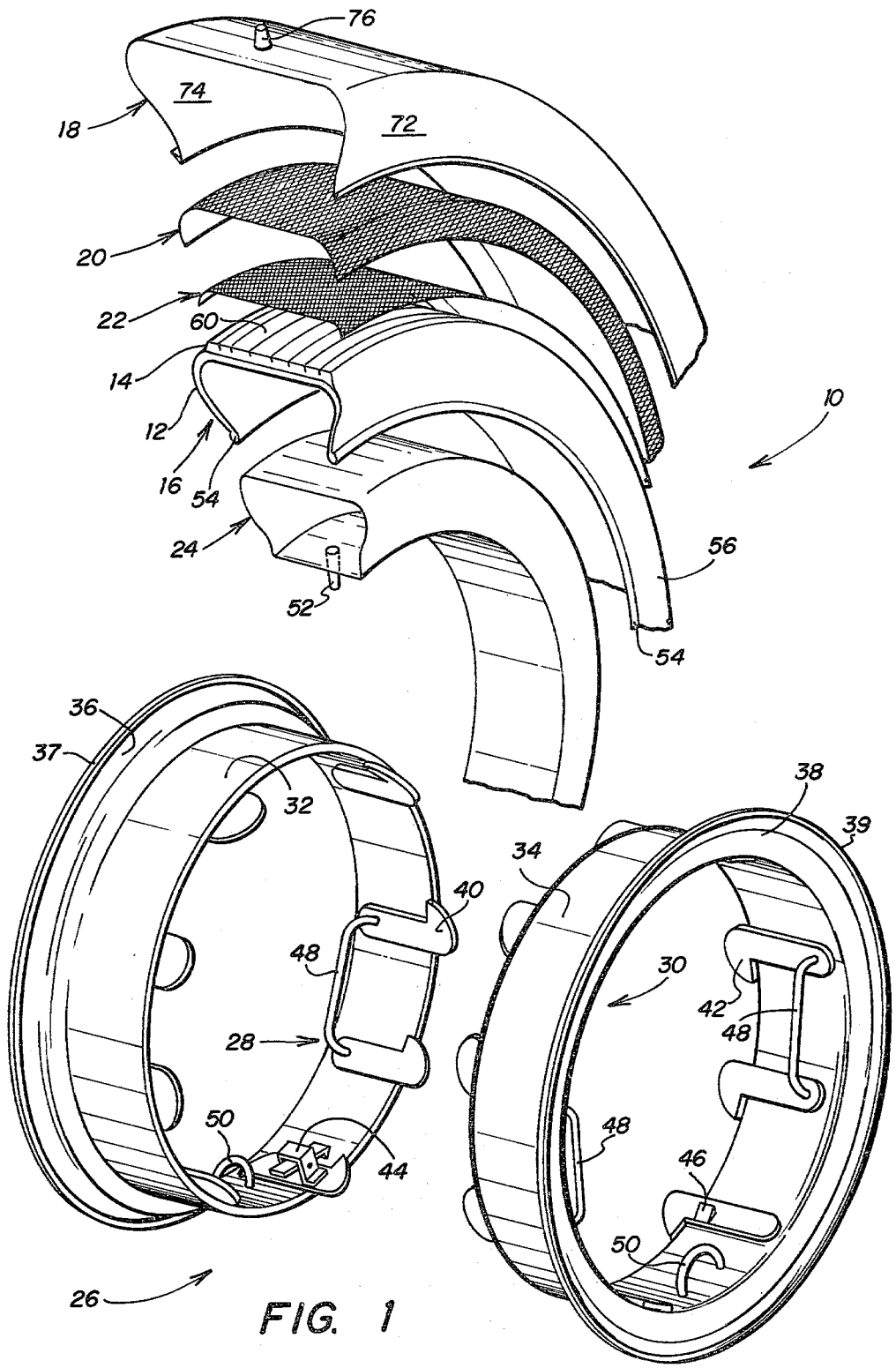
FIG. 1 is an exploded perspective view of the tire assembly in which the present invention is utilized.

Referring now to the Drawings wherein like reference numerals designate like or corresponding parts throughout the several views, and particularly referring to FIG. 1 thereof, there is shown a tire assembly 10 for use in curing the bond between a tire casing 12 and a tread material 14 of a tire 16 being retreaded. The tire assembly 10 includes a flexible envelope 18, a wick pad 20, a perforated layer 22, tire 16, an inner tube 24, and a two piece road type curing rim 26 for mounting the tire thereon and sealing the envelope between the rim and tire.

The road type curing rim 26 is comprised of interlocking side pieces 28 and 30. Each of the side pieces 28 and 30 have skirt portions 32 and 34, respectively, and rim members 36 and 38 extending generally radially outward from the lateral outermost edge of the skirt portions 32 and 34. Annular seals 37 and 39 are secured about the outer periphery of rim members 36 and 38. Hooks 40 and 42 are secured to the inner side of skirt portions 32 and 34 for interlocking the two side pieces 28 and 30 of the curing rim 26. A latch 44 and catch 46 are mounted on the side pieces 28 and 30, respectively, for locking the side pieces in the interlocking position. Handles 48 are mounted on the side pieces for manual handling and rings 50 are mounted on the side pieces for suspending the tire assembly for curing as hereinafter described. A road type curing rim of the type illustrated in FIG. 1 and described herein is manufactured by Elrick Industries, Inc. 70 Hegenberger Loop, Oakland, Calif.

Figure 2:
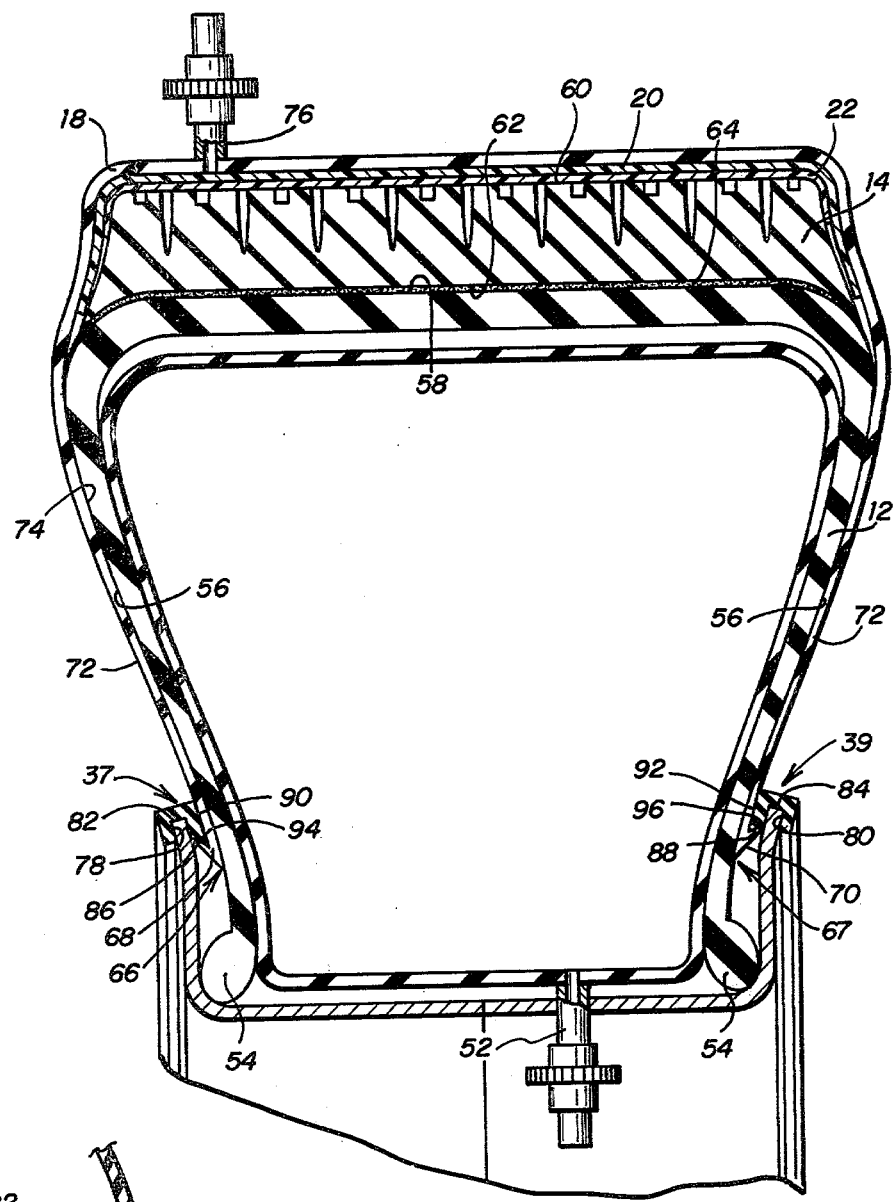
FIG. 2 is a radial cross sectional view of the tire assembly in which the first embodiment of the envelope seal of the present invention is employed.

The inner tube 24 is preferably of the common road type and includes a tube valve stem 52. The valve inner tube 24 is selected to properly fit the tire 16 being retreaded. With reference now to FIG. 2, the tire 16 includes a tire casing 12 having beads 54, sidewalls 56 and a buffed outer bonding surface 58. The tread material 14 includes a road contacting surface 60 and an inner bonding surface 62. An adhesive or cement 64 is interposed between outer and inner bonding surfaces 58 and 62 for bonding the tread material 14 and tire casing 12 to retread tire 16.

The perforated layer 22, which is preferably constructed of perforated polypropylene plastic, is applied around the entire circumference of road contacting surface 60. The wick pad 20 is preferably formed from nylon and is applied about the entire circumference of the road contacting surface 60 and radially inward adjacent bonding surfaces 58 and 62.

The flexible envelope 18 is formed of a generally uniform thickness material which covers the road surface 30 and extends radially inward adjacent the sidewalls 56 of the tire 16. At the radially inner edges 66 and 67 of the envelope 18, lips 68 and 70 are formed extending from the outer surface 72 of the envelope 18. When the tire 16 and other components are mounted on the curing rim 26 to form tire assembly 10, the inner surface 74 of the envelope 18 is in sealing engagement with the sidewalls 56 of the tire casing 12 and the lips 68 and 70 and outer surface 72 of envelope 28 are in sealing engagement with annular seals 37 and 39, respectively. An envelope valve stem 76 is provided on the outer periphery of the envelope 18.

Figure 2A:
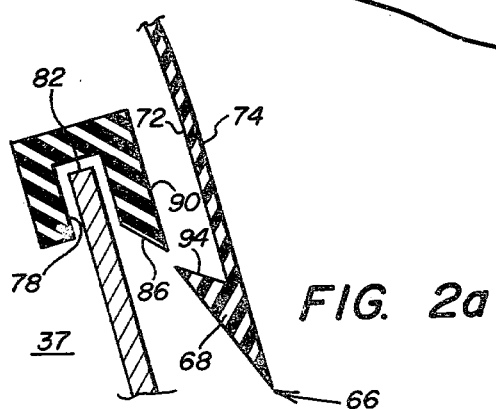
FIG. 2a illustrates the detail of the first embodiment of the envelope seal of the present invention.

With reference now to FIGS. 2 and 2a, the envelope seal of the present invention will be described in greater detail. The annular seals 37 and 39 are formed of a flexible sealing material such as a rubber compound, polyethene or polytetrafluoroethylene. Each seal is provided with a notch 78 for engagement with the outer edges 82 of the rim members 36 and 38. The diameter of each of the seals 37 and 39 in repose is less than the diameter of the edges of the rim members so that the seals must be stretched to be fit over the edges and are retained in sealing engagement with the rim members. In addition, an adhesive or glue may be applied between the seals 37 and 39 and the rim members 36 and 38 to augment the sealing engagement therebetween. Each seal 37 and 39 defines a first annular sealing face 86 and 88 and a second annular sealing face 90 and 92 on their outer surfaces, respectively. The first annular sealing faces 86 and 88 are inclined at an angle relative to the sidewalls 56, inner and outer surfaces 72 and 74 of the envelope 18 and rim members 36 and 38 when the envelope is in sealing engagement with the curing rim and tire. The second annular sealing faces 90 and 92 are disposed substantially parallel to the adjacent sidewalls, inner and outer surfaces of the envelope and the rim members. The seals 37 and 39 permit a more effective seal to be made between envelope 18 and the curing rim 26 than is possible by an envelope directly engaged to a curing rim, which is typically formed of a metal, to create a seal. In addition, the seals 37 and 39 prevent burrs on curing rim 26 from cutting or tearing envelope 18.

The lips 68 and 70 have annular sealing faces 94 and 96 formed thereon. The sealing faces 94 and 96 are also inclined to the sidewalls, inner and outer surfaces of the envelope and rim members when the envelope is sealed and are generally parallel to the first annular sealing faces 86 and 88 when properly aligned. When mounting the tire 16, envelope 18 and other components on the curing rim 26 to form tire assembly 10 and seal the envelope to both the curing rim and tire, the inner tube 24 is first inflated within tire 16 through valve stem 52 to a pressure sufficient to eliminate any folds or creases in the innertube. The tire and other components are then mounted on the curing rim 26. The inner tube is then further inflated to a pressure of typically 5 to 8 pounds per square inch (psi). This inflation also serves to urge the sidewalls of the tire casing 12 laterally outward against the rim members 36 and 38 so that the sidewalls and inner surface 74 of envelope 18 are in contact adjacent the outer edges 82 and 84 of the rim members. The envelope 18 is then inflated through the valve stem 76 to a pressure sufficient to expand the envelope and urge the envelope radially outward so that the annular sealing faces 94 and 96 are aligned with the first annular sealing faces 86 and 88 as shown in FIG. 2. The contact between the inside walls 56 and inner surface 74 of the envelope resulting from the inflation of the inner tube forms a seal sufficient to permit this inflation. The inner tube 24 may then be further inflated to a higher pressure, such as 30 psi. This pressure urges the sidewalls 56 of the tire casing 12 both laterally outward toward the rim members 36 and 38 and radially outward away from the curing rim 26 so that the first annular sealing faces 86 and 88 and annular sealing faces 94 and 96 are urged into sealing engagement and the second annular sealing faces 90 and 92 are urged into sealing engagement with a portion of the outer surface 72 of envelope 18. The sidewalls and inner surface 74 of the envelope 18 are urged into tighter sealing engagement therebetween.

It can be seen from FIGS. 1 and 2 and understood from the description above that the envelope seal is made totally between sealing materials. The prior art, in contrast, has required that sealing contact be made between a sealing material and the curing rim, which is typically of metal, and does not create as effective an envelope seal as does the present invention. In addition, the present invention provides two separate and independent seals between the envelope and curing rim, one of which is inclined to the general alignment of the sidewalls, surfaces of the envelope and rim members adjacent the envelope seal. This permits both the expanding actions of the tire when inflated, expanding laterally towards the rim members and radially outward away from the curing rim, to urge the seal faces into sealing engagement to form a more effective seal.

A second embodiment of the envelope seal of the present invention is illustrated in FIG. 3. The annular seal 39 of the second embodiment is provided with a first concave seal face 100 having a generally arcuate cross section. In all other respects, the annular seal 39 is identical to the annular seal 39 of the first embodiment, with the outer surface 72 of envelope 18 in sealing engagement with second annular sealing face 92. The envelope 18 of the second embodiment is provided with a lip 104 havving a curved sealing face 106 of generally uniform radius adapted for sealing engagement with the concave seal face 100. The angle of contact between the sealing faces 100 and 106 varies continuously from a point generally perpendicular to the sidewalls, surfaces of the envelope and rim members to an angle generally parallel thereto. The configuration of the annular seal and lip of envelope 18 on rim member 36 is the mirror image of the lip and annular seal illustrated in FIG. 3.

A third embodiment of the envelope seal of the present invention is illustrated in FIG. 4. The annular seal 39 has a first convex seal face 108 and the envelope 18 has a lip 110 defining a concave sealing face 112 having a generally uniform external radius of curvature in cross section and on annular sealing face 113. The angle of engagement between sealing faces 108 and 112 varies continuously from a perpendicular to parallel relationship with the rim members, surfaces of the envelope and sidewalls in a manner similar to the second embodiment illustrated in FIG. 3. Annular sealing face 113 is in sealing engagement with the inner surface of rim member 38, thereby defining a third independent seal between the curing rim and envelope. The seals between outer surface 72 and sealing face 92 and between sealing face 113 and rim member 38 are parallel but spaced laterally from each other. Again, the lip and annular seal adjacent rim member 36 is the mirror image of the annular seal 39 and lip 104 illustrated in FIG. 4.

A fourth embodiment of the envelope seal of the present invention as illustrated in FIG. 5. The annular seal 39 is provided with a first annular sealing face 114 which is inclined generally perpendicular to the sidewalls, surfaces of the envelope and rim member. The lip 116 of a envelope 18 of the fourth embodiment defines a sealing face 118 which is also perpendicularly inclined and a parallel annular sealing face 119 to again form a third independent seal. The annular seal and lip adjacent the rim member 36 are the mirror image of annular seal 39 and lip 116 as illustrated in FIG. 5.

A fifth embodiment of the envelope seal of the present invention is illustrated in FIG. 6. In this embodiment, rim member 38 is formed with a flange 120 at its radially outer edge having a generally circular cross section and defining a concave sealing face 121. The envelope 18 has a lip 122 extending therefrom and having a curved sealing face 124 of generally uniform radius which is adapted to engage the sealing face 121. The rim member 36 has a similar flange at its radially outer end to receive a similarly shaped sealing face on the envelope.

FIG. 7 illustrates a tire assembly 10 suspended within a pressure chamber 126 in preparation for curing under high pressure and temperature. The tire assembly is suspended from a monorail 128 by means of dolly 130 and chain 132 through the inside of curing rim 26 and rings 50. When the tire assembly 10 is properly positioned within the pressure chamber 126, the tube valve stem 52 is connected to a manifold 134 by air line 136 and chuck 138. The envelope valve stem 76 is connected to an individual petcock valve 140 through an air line 142 and chuck 144. It is crucial to the curing operation that the tube valve stem 52 be positioned at approximately the eleven o'clock position and that the envelope valve stem 76 be positioned at approximately the four o'clock position as illustrated in FIG. 7.

Prior to mounting on the curing rim 26, the tire casing 12 is inspected and buffed on its outer bonding surface 58. Adhesive 64 and precured tread material 14 is applied and stitched to tire casing 12. These operations are well known in the trade. The tire assembly 10 is then constructed in the manner illustrated in FIGS. 1 and 2 and described hereinabove. Both perforated layer 22 and wick pad 20 may be maintained in their proper position by staples. In centering the envelope 18 in the tire assembly 10, the envelope valve stem 76 must be positioned directly over the wick pad 20. The envelope 18 may be properly centered by rotating the tire 16.

When the envelope 18 is inflated through envelope valve stem 76 to align the sealing faces 86, 88, 94 and 96, an air chuck is attached to the valve stem 76 such as shown in FIG. 2 to keep the envelope inflated. The envelope is maintained in the inflated condition and the inner tube is inflated to a higher pressure, typically 30 psi, through the tube valve stem 52. The pressure within the inner tube 24 is similarly maintained by an air chuck attached to the tube valve stem 52. The tire assembly 10 is then maintained in this state until loading into the pressure chamber 126. Immediately prior to loading within the pressure chamber, the air pressure in both envelope 18 and inner tube 24 is checked. A decrease in air pressure in either the inner tube or envelope would indicate a leak in the envelope seal which must be repaired before curing.

When loading the tire assembly 10 into the pressure chamber 126 as shown in FIG. 7, the air chuck from the envelope valve stem 76 is removed to deflate the envelope 18. The air chuck on the tube valve stem 52 is retained to maintain the inner tube pressure. When properly positioned in the pressure chamber 126, the air line 142 and chuck 144 are connected to the envelope valve stem 76 and the chuck on the valve tube stem 52 is removed and replaced by chuck 138 and air line 136.

Figure 8:
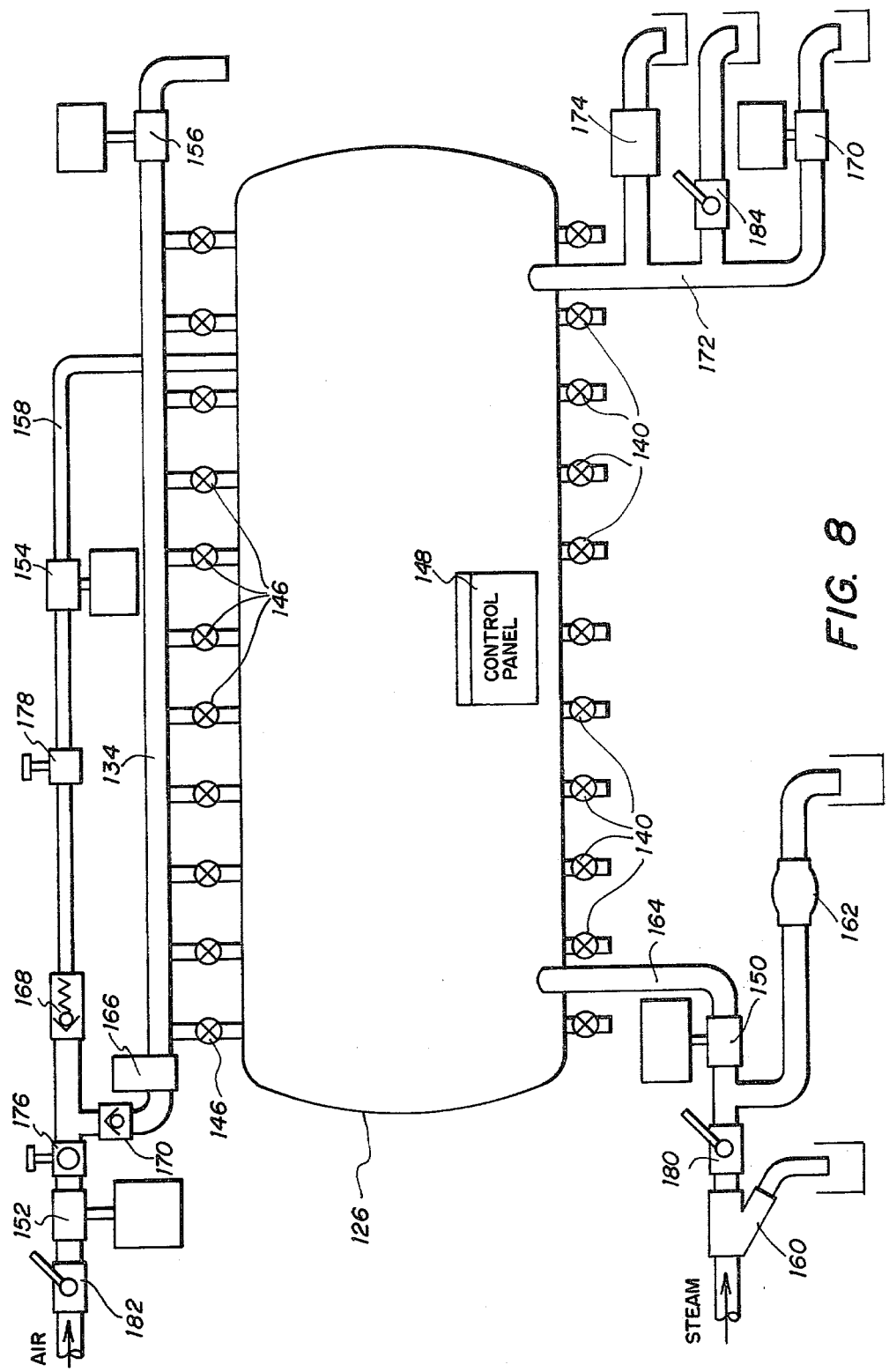
FIG. 8 illustrates schematically a system for curing a tire being retreaded.

FIG. 8 illustrates the operation of curing the tires within the pressure chamber 126. After a number of individual tire assemblies 10 have been properly positioned in the air chamber, the chamber door is closed and locked. The pressure chamber 126 illustrated in FIG. 8 is designed to hold 11 tire assemblies 10. This number may vary according to the pressure chamber size and the quantity of tires retreaded so that the pressure chamber is in operation as continuously as possible to minimize overhead costs. After the door is closed and locked, the petcock valves 140 and 146 are opened. An automatic control system in control panel 148 opens valves 150, 152 and 154 and closes valve 156. This action admits compressed air from a reservoir (not shown) into the pressure chamber through line 158 and inner tubes of each tire assembly through manifold 134. Steam from a steam reservoir (not shown) passing through Y-strainer 160 and bypassing thermostatic steam trap 162 is also admitted to the pressure chamber through inlet line 164.

The air in the inner tube of each of the tire assemblies is maintained at a pressure of 105 psi with pop-off valve 166 set at 115 psi to limit the pressure. The check valve 168 and free flow check valve 170 maintain the pressure within pressure chamber 126 at a value 30 psi below the pressure in the inner tubes of the tire assemblies, i.e. at 75 psi, plus or minus 5 psi. The steam entering the pressure chamber 126 heats the interior of the pressure chamber to a temperature of 310° F. A safety override switch within the control system will automatically dump steam and air pressure through valves 156 and 170 through steam exhaust 172, bypassing bucket trap 174, should the chamber temperature exceed 325° F. The pressure chamber temperature is maintained at 310° F. for a period of at least 60 minutes so that the adhesive between the tread material and tire casing is properly cured to retread the tire. The pressure chamber is totally automatic. All cure times, pressures and temperatures are recorded within control panel 148. During the curing cycle, the inner tube pressure and chamber pressure is monitored and may be controlled by manually operating pressure regulators 176 and 178 if necessary. Pressure within the pressure chamber should be maintained 25 to 35 psi less than the pressure of the inner tubes of the tire assemblies. The envelope petcock valves 140 are monitored. If a leak of over 5 psi develops at one petcock, this indicates that the envelope seal between the tire, envelope and curing rim in that tire assembly is lost. The envelope petcock valve 140 should then be closed and the corresponding inner tube petcock valve 146 also closed. This will isolate the tire assembly in the chamber and allow the other ten tire assemblies to cure normally. If an emergency develops, manual valves 180, 182 and 184 may be operated as necessary.

At the end of the cure cycle, the control system in control panel 148 automatically dumps the steam and air pressure through valves 156 and 170 to stop the cure cycle. The door of the pressure chamber may then be opened and the tire assemblies removed. After the envelope, perforated layer, wick pad and curing rim have been removed from the retreaded tire, the tire is subjected to a post cure inspection. The envelope, wick pad, perforated layer and curing rim may then be used to retread another tire.

It can be seen that the present invention provides an improved envelope seal which permits sealing engagement to be made between resilient sealing material between the sidewalls of the tire, the envelope and the curing rim to enhance the envelope seal. In addition, the present invention discloses an improved envelope seal in which the outer surface of the envelope has a lip extending therefrom with a sealing face defined thereon inclined to the surfaces of the envelope, sidewalls of the tire and rim members. The inclined sealing surface is adapted to be aligned with a sealing face on annular seals secured to the rim members. The envelope is then sealed to the curing rim not only by the urging of the sidewalls of the tire laterally outward as the inner tube or tire is inflated but also by the radially outward motion of the tire to provide enhanced sealing. The present invention therefore permits the envelope and curing rim to be sealed by two or more separate seals inclined relative to each other to improve the envelope seal.

While several embodiments of the present invention have been described in detail herein and shown in the accompanying Drawings, it will be evident that various further modifications are possible without departing from the scope of the invention.

I claim:

1. A method for preparing a tire for curing in a pressure chamber, the tire having sidewalls and including a tire casing and tread material, each having a bonding surface, comprising the steps of:
   mounting the tire on a curing rim having rim members extending generally radially outward adjacent the sidewalls of the tire to a peripheral edge;
   securing an annular seal about the peripheral edge of said rim members, said annular seal having a notch therein for receiving said peripheral edge and defining first and second seal faces thereon, each inclined relative to the other;
   covering the bonding surfaces of the tire with a flexible envelope extending generally radially inward adjacent the sidewalls of the tire to radially inner edges, said envelope having lips extending laterally from the outer surface thereof defining third seal faces thereon;
   aligning the first and third seal faces; and
   inflating the tire so that the lateral and radial expansion of the tire urges said first and third seal faces, said second seal faces and the outer surface of the envelope and the inner surface of the envelope and sidewalls into sealing engagement to define two independent seals between said envelope and curing rim.

2. The method of claim 1 wherein the step of securing an annular seal about the peripheral edge of each of said rim members further includes defining first seal faces having a generally arcuate cross section having a continuously varying inclination relative to said second seal faces.

3. The method of claim 1 wherein the step of securing an annular seal about the peripheral edge of each of said rim members further includes defining first seal faces inclined perpendicularly to said second seal faces.

4. The method of claim 1 wherein the step of covering the bonding surfaces of the tire with a flexible envelope further includes defining fourth seal faces on said lips, said fourth seal faces being generally parallel said second seal faces when said first and third seal faces are aligned and spaced therefrom so that inflating the tire urges said fourth seal faces into sealing engagement with the inner surface of said rim members to form a third independent seal between said envelope and said curing rim.

5. An apparatus for use in curing a tire in a pressure chamber, the tire including a tire casing, tread material and an adhesive therebetween for bonding adjacent surfaces of the tire casing and tread material, the tire having sidewalls, comprising:
   a curing rim for mounting the tire thereon having rim members extending generally radially adjacent the sidewalls of the tire;
   an annular seal secured about the periphery of each of said rim members defining first and second seal faces inclined to one another;
   a flexible envelope for covering the bonding surfaces of the tire casing and tread material extending radially inward adjacent the sidewalls of the tire and having annular lips on its outer surface defining third seal faces inclined to the outer surface of said envelope;
   means for aligning said first and third seal faces; and
   means for inflating the tire to urge said first and third seal faces together and to urge said second face and the inner surface of said envelope into sealing engagement to define two independent seals to seal said envelope to the curing rim and tire.

6. The apparatus of claim 5 wherein said first and third seal faces have an arcuate cross section to provide a continuously varying inclination between the inner surface of said rim member and outer surface of said envelope, respectively.

7. The apparatus of claim 5 wherein said first and third seal faces are inclined perpendicularly to the inner surfaces of said rim member and said envelope, respectively.

8. The apparatus of claim 5 wherein said lips define fourth seal faces generally parallel the outer surface of said envelope and spaced outwardly therefrom, the inflation of the tire urging said fourth seal faces and the inner surfaces of rim members into sealing engagement.

* * * * *